United States Patent [19]
Iwazawa

[11] Patent Number: 6,072,767
[45] Date of Patent: Jun. 6, 2000

[54] TURNTABLE DEVICE FOR AN OPTICAL DISK

[75] Inventor: Naotoshi Iwazawa, Tokyo, Japan

[73] Assignee: NEC Corporation, Tokyo, Japan

[21] Appl. No.: 08/995,782

[22] Filed: Dec. 22, 1997

[30] Foreign Application Priority Data

Dec. 27, 1996 [JP] Japan .................................. 8-350000

[51] Int. Cl.[7] .............................................. G11B 25/00
[52] U.S. Cl. ............................................................ 369/271
[58] Field of Search ................................... 369/75.2, 115, 369/191, 207, 208, 209, 211, 264, 265, 270, 281, 292, 289, 290

[56] References Cited

U.S. PATENT DOCUMENTS

| | | | |
|---|---|---|---|
| 4,514,839 | 4/1985 | Eisemann | 369/270 |
| 4,618,951 | 10/1986 | Okita et al. | 369/270 |
| 4,768,185 | 8/1988 | Camerik | 369/270 |
| 4,791,624 | 12/1988 | Stinesen | 369/270 |
| 5,050,159 | 9/1991 | Kenmotsu | 369/270 |
| 5,633,856 | 5/1997 | Mukawa | 369/270 |
| 5,724,209 | 3/1998 | Dunckley et al. | 360/98.08 |

*Primary Examiner*—John H. Wolff
*Assistant Examiner*—Angel Castro
*Attorney, Agent, or Firm*—J. Warren Whitesel; Laff, Whitesel & Saret, Ltd.

[57] ABSTRACT

A turntable device of the present invention is applicable to, e.g., an optical disk drive and driven by a spindle motor while supporting an optical disk or similar disk-like recording medium thereon. A turntable assembly is made up of an upper turntable and a lower turntable. The upper turntable includes a projection having a tapered portion, and spring portions. The tapered portion and spring portions cooperate to surely obviate the eccentricity of the disk. The lower turntable includes a recess forming a space for accommodating the spring portions, thereby reducing the overall thickness of the assembly. The turntable device is therefore highly portable and small size.

6 Claims, 6 Drawing Sheets

TURNTABLE DEVICE FOR AN OPTICAL DISK

BACKGROUND OF THE INVENTION

The present invention relates to a turntable device for, e.g., an optical disk drive and, more particularly, to a turntable device which is driven by a spindle motor while carrying a disk-like recording medium implemented as an optical disk thereon.

An optical disk drive for driving an optical disk which is a removable hubless recording medium is conventional and includes a turntable and an optical head. To allow the optical axis of the head to accurately track the disk, it is preferable that the eccentricity of the disk be as small as possible. Specifically, the disk is loaded on the turntable with its center hole coupled over a projection protruding from the turntable and having the same diameter as the hole. When the projection is cylindrical, any clearance between the projection and the edge of the hole would bring about eccentricity. However, such a clearance is necessary for the disk to be smoothly loaded and unloaded from the turntable. Moreover, the hole of the disk has some tolerance for production reasons, so that the above clearance depends on the disk so long as the projection is cylindrical.

While various approaches have heretofore been proposed for obviating the eccentricity of an optical disk, none of them is capable of fully obviating it. In addition, conventional turntable devices cannot be reduced in size, particularly thickness, Technologies relating to the present invention are taught in, e.g., Japanese Patent Laid-Open Publication Nos. 60-124056, 60-124057, 60-124058, 60-187966 and 63-187452, Japanese Utility Model Laid-Open Publication No. 63-195654, Japanese Patent Laid-Open Publication Nos. 64-23456 and 1-185869, and Japanese Utility Model Laid-Open Publication Nos. 2-50852 and 2-128244.

SUMMARY OF THE INVENTON

It is therefore an object of the present invention to provide a turntable device for an optical disk drive which is miniature and capable of surly obviating the eccentricity of an optical disk.

A turntable device for an optical disk of the present invention includes a disk-like turntable assembly made up of an upper turntable having a disk loading surface at its outer perimeter for supporting a hubless optical disk, and a lower turntable sustaining the upper turntable in a laminate configuration. A camper clampes the optical disk loaded on the turntable assembly at the axis of the assembly. A spindle motor drives the turntable assembly. The upper turntable includes a projection positioned at the center of the upper turntable, having a flaring outer periphery, having a central portion whose end protrudes above the disk loading surface of the upper turntable, and having a circumferential tapered portion, and an annular member supporting the projection via a plurality of spring portions radially extending out from the projection at equally spaced positions. The disk loading surface is implemented by the upper surface of the annular member. The lower turntable includes a body fixed in place coaxially with the upper turntable, a boss located at the center of the body and protruding upward without its outer periphery thereof being restricted by the tapered portion, and a recess surrounding the boss for forming a space which allows the tapered portion to move. The tapered portion is suitably sized in matching relation to a hole formed in the center of the optical disk such that a part of the outer periphery of the tapered portion contacts the edge of the hole of the optical disk.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1A:
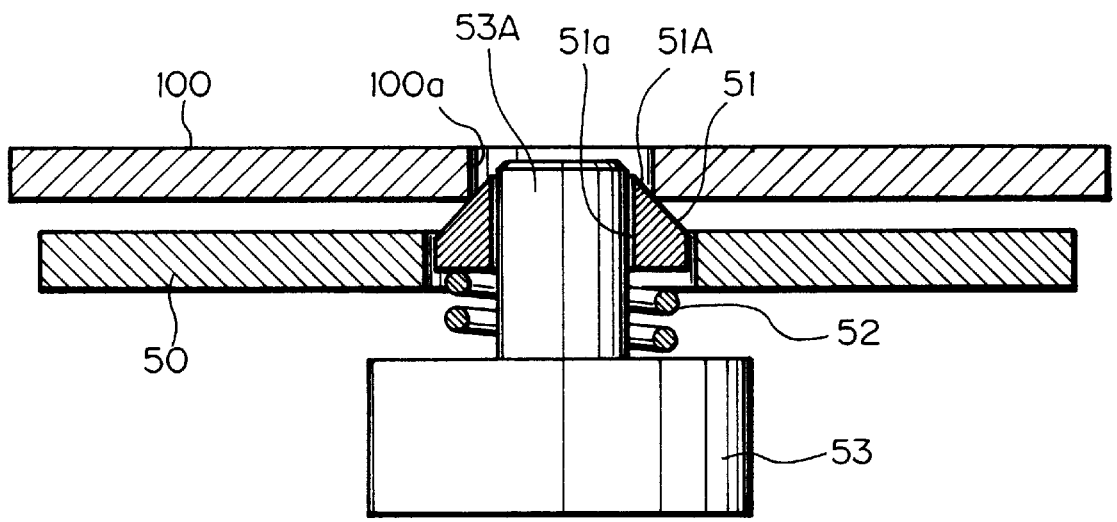
FIG. 1A shows a conventional turntable and an optical disk in a condition just after the loading of the disk.
Figure 1B:
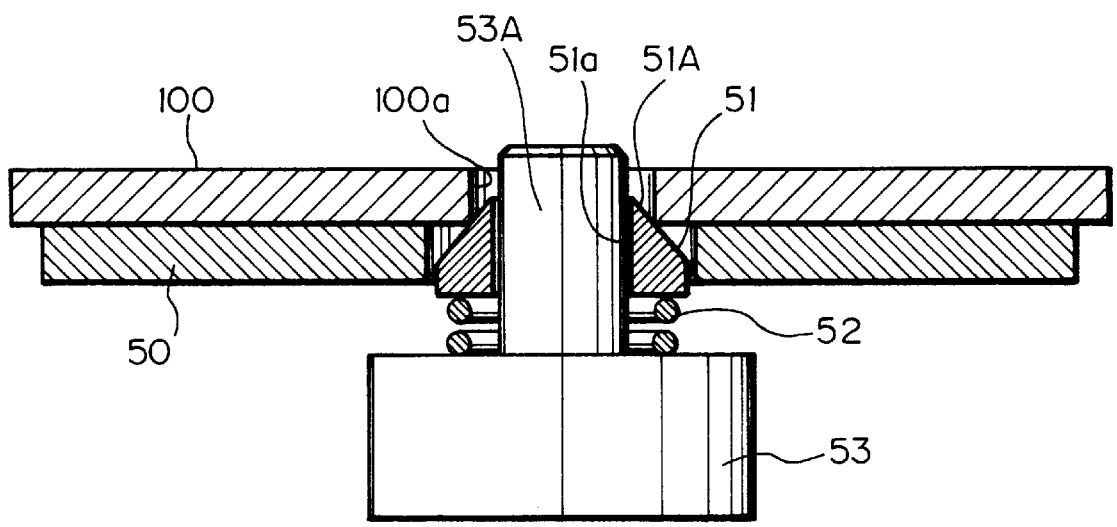
FIG. 1B is a view similar to FIG. 1A, showing a condition wherein the disk is lowered due to its own weight and held on the turntable.

To better understand the present invention, brief reference will be made to a conventional turntable device with an implementation for obviating the eccentricity of an optical disk, shown in FIGS. 1A and 1B. As shown, a turntable 50 includes a projection 51 having a tapered portion 51A. The tapered portion 51A is tapered in the direction in which a disk 100 is loaded. The projection 51 is implemented as a separate movable member which sinks when loaded with the disk 100, while maintaining engagement between the turntable 50 and a drive shaft 53A in the direction of rotation. There are also shown in FIGS. 1A and 1B a coil spring 52 and a motor 53. The disk 100 is formed with a hole 100a at its center.

In the above arrangement, the disk 100 contacts the projection 51 only at the bottom edge or corner of the hole 100a. This allows the disk 100 to be smoothly loaded and unloaded from the turntable 50 without any friction. The position of the disk 100 is unconditionally determined by the surface of the turntable 50 supporting the disk 100. This, coupled with the fact that the bottom edge of the hole 100a contacts the tapered portion 51A, unconditionally determines the positional deviation of the center of rotation of the disk 100 (in the direction in which eccentricity occurs).

The tapered portion 51A of the projection 51 has substantially no eccentricity in a plane perpendicular to the axis of rotation. Therefore, when the disk 100 is positioned, as stated above, eccentricity ascribable to the tolerance, if any, of the hole 100a of the disk 100 does not occur.

Japanese Utility Model Laid-Open Publication Nos. 2-50852 and 2-128244 mentioned earlier each discloses a mechanism capable of accurately positioning a damper at a center axis. Japanese Patent Laid-Open Publication No. 64-23456 also mentioned earlier teaches a tapered portion which sinks when loaded with a disk. This tapered portion, however, as a problem that a clearance exists between the tapered portion and a shaft and causes a disk to spin with eccentricity which is indefinite. On the other hand, in the above Laid-Open Publication No. 64-23456, the tapered portion is divided into three portions. When a disk is loaded, the three tapered portions are pressed against the shaft for the purpose of obviating the indefinite eccentricity.

However, none of the conventional devices described above can fully obviate the eccentricity of a disk. Even in the arrangement shown in FIGS. 1A and 1B, the clearance between a through hole 51a formed in the center of the projection 51 and the drive shaft 53A received in the hole 51a sequentially increases and brings about eccentricity because they rub against each other every time the disk 100 is loaded or unloaded. In Laid-Open Publication No. 64-23456, the clearance between the tapered portion and the shaft causes indefinite eccentricity to occur when a disk is loaded. Because this clearance is essential for the tapered portion to be movable, the above problem cannot be solved at all.

Further, a coil spring is included in each of the conventional turntable devices in order to allow the tapered portion to move up and down. The coil spring, however, increases the overall thickness of the turntable device. This is contradictory to the increasing demand for a thin optical disk drive configuration.

Figure 2:
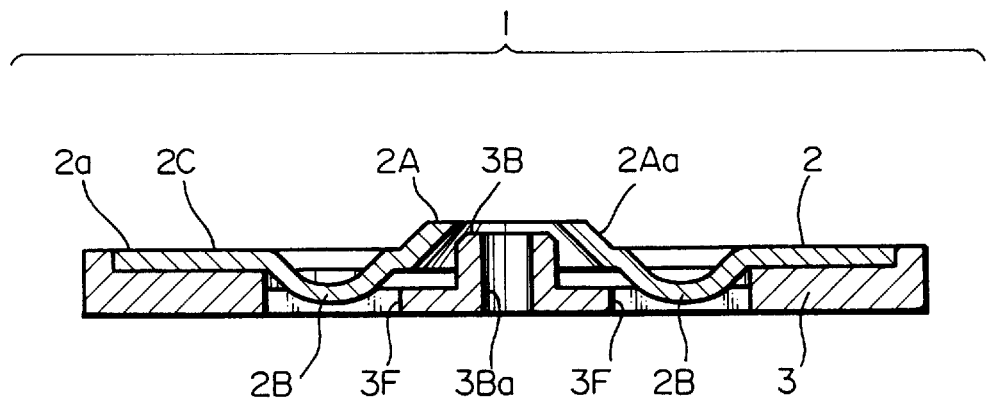
FIG. 2 is a vertical section showing an essential part of a turntable device embodying the present invention.
Figure 3:
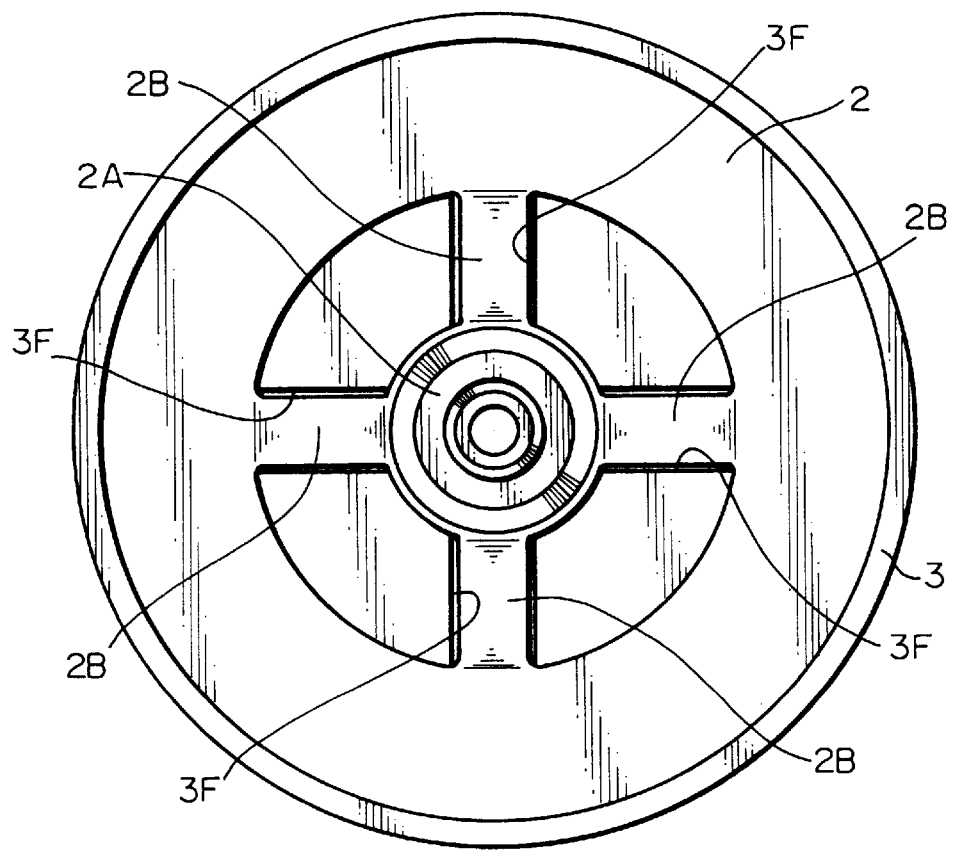
FIG. 3 is a plan view showing the illustrative embodiment.
Figure 8:
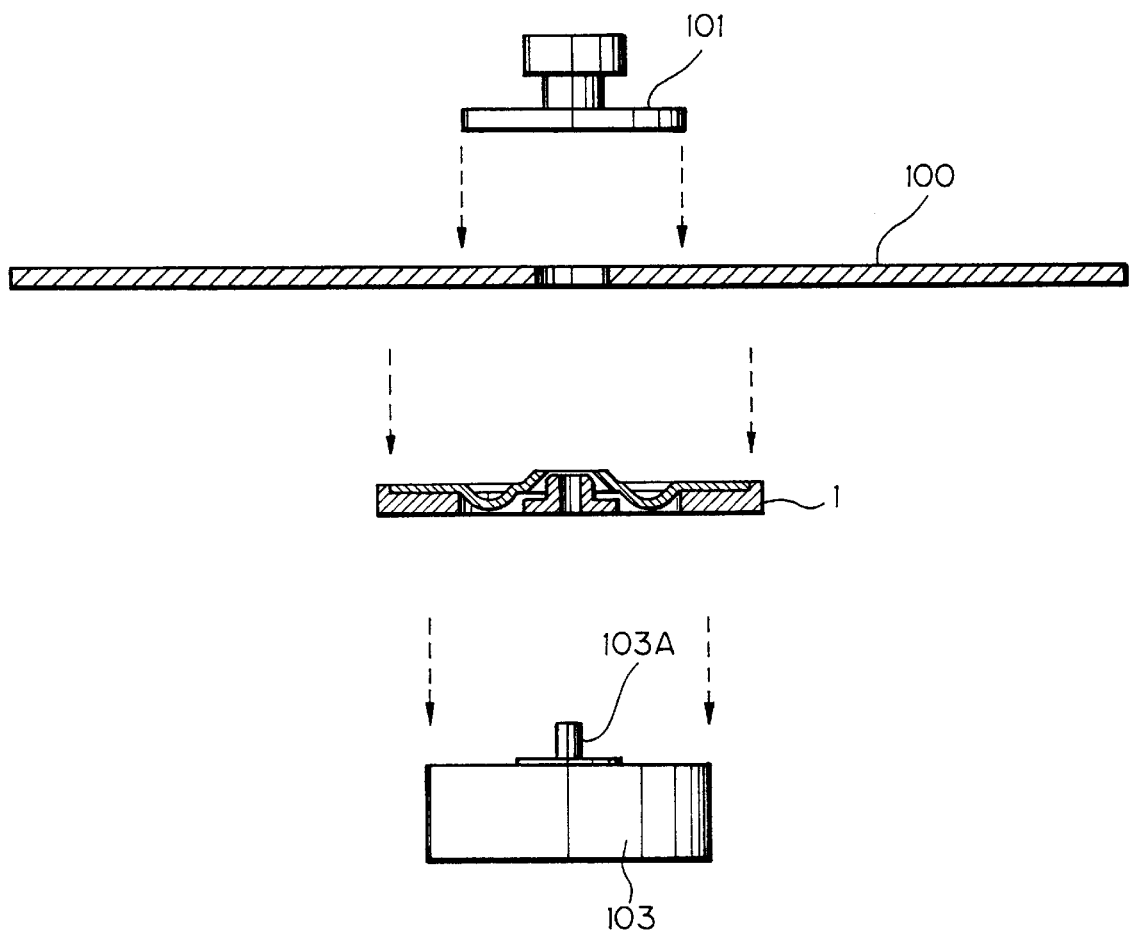
FIG. 8 is an exploded view showing a relation between the illustrative embodiment, a spindle motor for driving it, and an optical disk.

Referring to FIG. 2, a turntable device embodying the present invention and applicable to a storage medium in the form of a disk will be described. As shown, the turntable device includes a turntable assembly generally designated by the reference numeral 1. As shown in FIG. 8, the storage medium is implemented as an optical disk 100. The turntable assembly 1 is loaded with and supports the disk 100 coaxially therewith. The disk 100 is removably positioned at the center of the turntable assembly 1 by a clamper 101 which will be described with reference to FIG. 8. A spindle motor 103 (see FIG. 8) causes the entire turntable assembly 1 to spin at a preselected speed in a preselected direction.

The turntable assembly 1 is made up of an upper turntable 2 having a disk loading surface 2a on its top, as viewed in FIG. 2, and a lower turntable 3 sustaining the upper turntable 2 in a laminate configuration.

Figure 4:
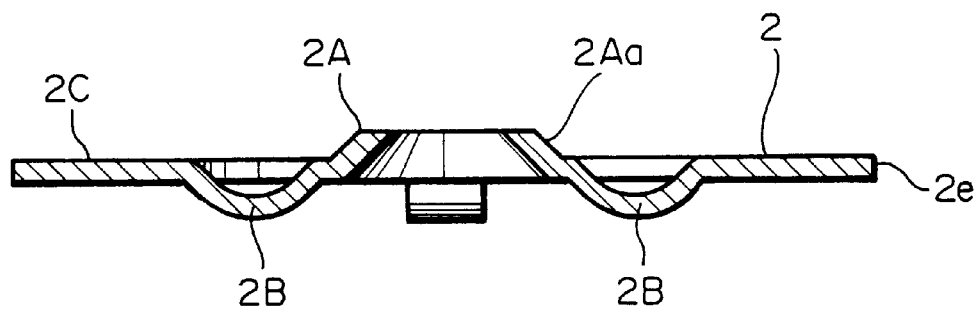
FIG. 4 is a vertical section showing an upper turntable included in the illustrative embodiment.
Figure 5:
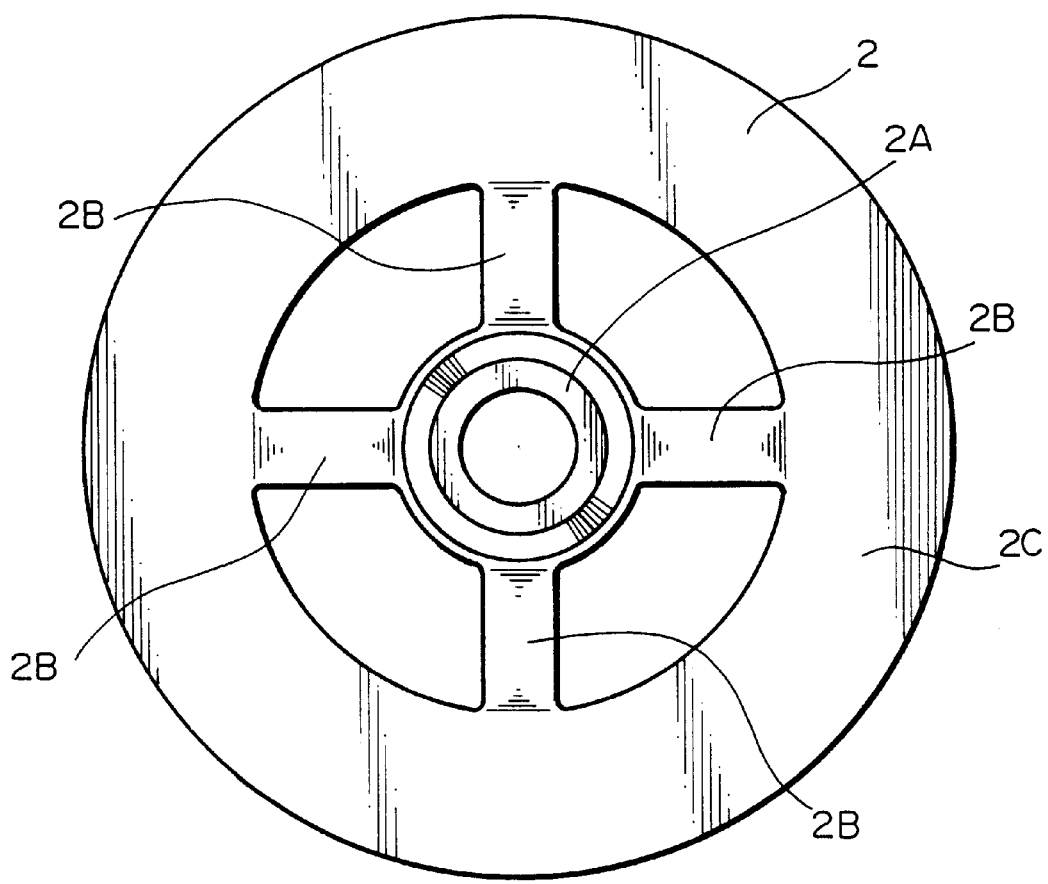
FIG. 5 is a plan view of the upper turntable.

As shown in FIGS. 4 and 5, the upper turntable 2 has a projection 2A at its center. The projection 2A has a tapered portion 2Aa flaring downward, as viewed in FIG. 4. The top of the projection 2A lies in a plane above the disk loading surface 2a. A plurality of (four in the embodiment) spring portions 2B, resembling leaf springs, extend radially outward from the projection 2A. The spring portions 2B are equally spaced from each other in the circumferential direction of the turntable 2. The projection 2A is supported by an annular rim portion or member 2C via the spring portions 2B. The rim portion 2C is substantially flush with and coaxial with the projection 2A. The top of the rim portion 2C forms the disk loading surface 2a mentioned earlier.

Figure 9A:
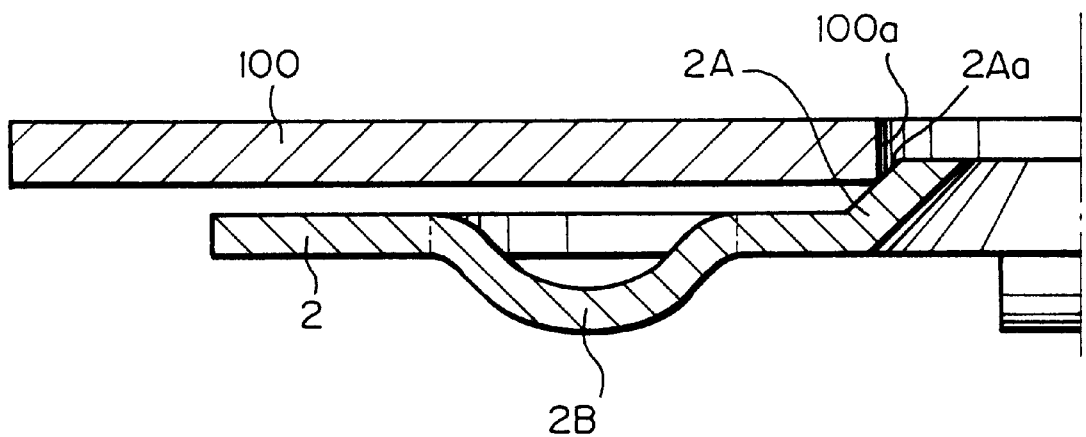
FIG. 9A shows the disk which has just been loaded on the illustrative embodiment.
Figure 9B:
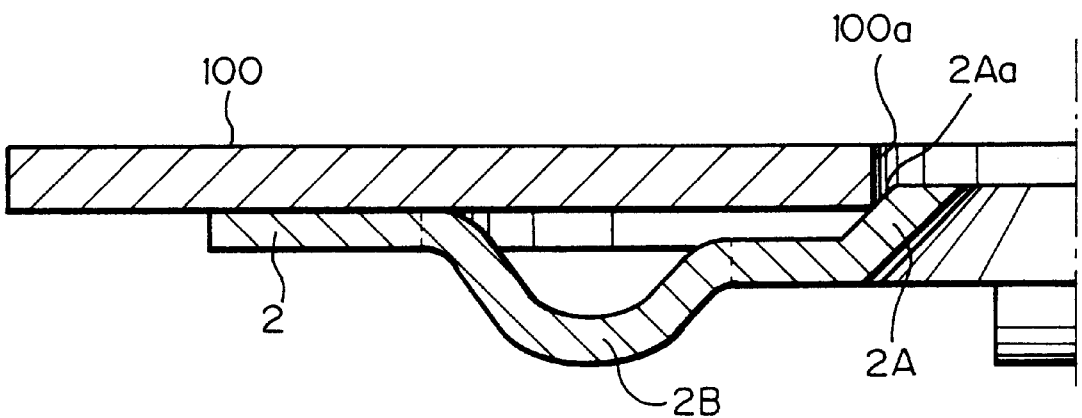
FIG. 9B is a view similar to FIG. 9A, showing a condition wherein the disk is lowered due to its own weight and fixed in position.

As shown in FIGS. 9A and 9B, when the disk 100 having a hole 100a at its center is loaded on the disk loading surface 2a, the edge of the hole 100a is supported by the tapered portion 2Aa of the projection 2A. In this condition, the spring portions 2B allow the disk 100 to move downward. In the illustrative embodiment, the spring portions 2B each is convex downward, i.e., toward the lower turntable 3 in an arcuate configuration. The spring portions 2B are therefore expandable without contacting the disk 100 and allow the projection 2A to move up and down.

The entire upper turntable 2 including the springs 2B is formed of a plastic having elasticity. Of course, the four spring portions 2B may be replaced with two, three, five or more spring portions, if desired.

Figure 6:
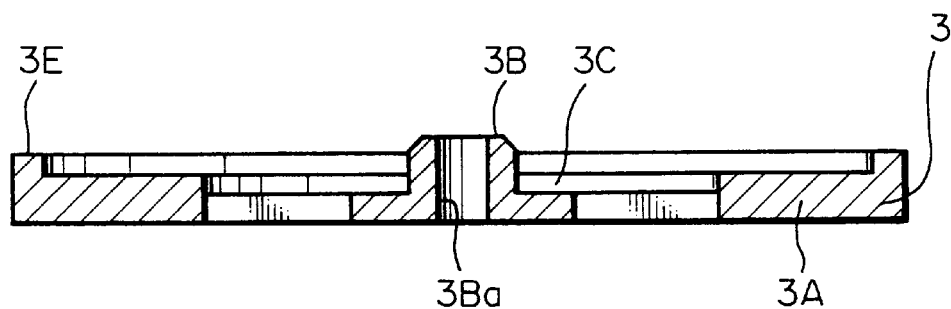
FIG. 6 is a vertical section showing a lower turntable also included in the illustrative embodiment.
Figure 7:
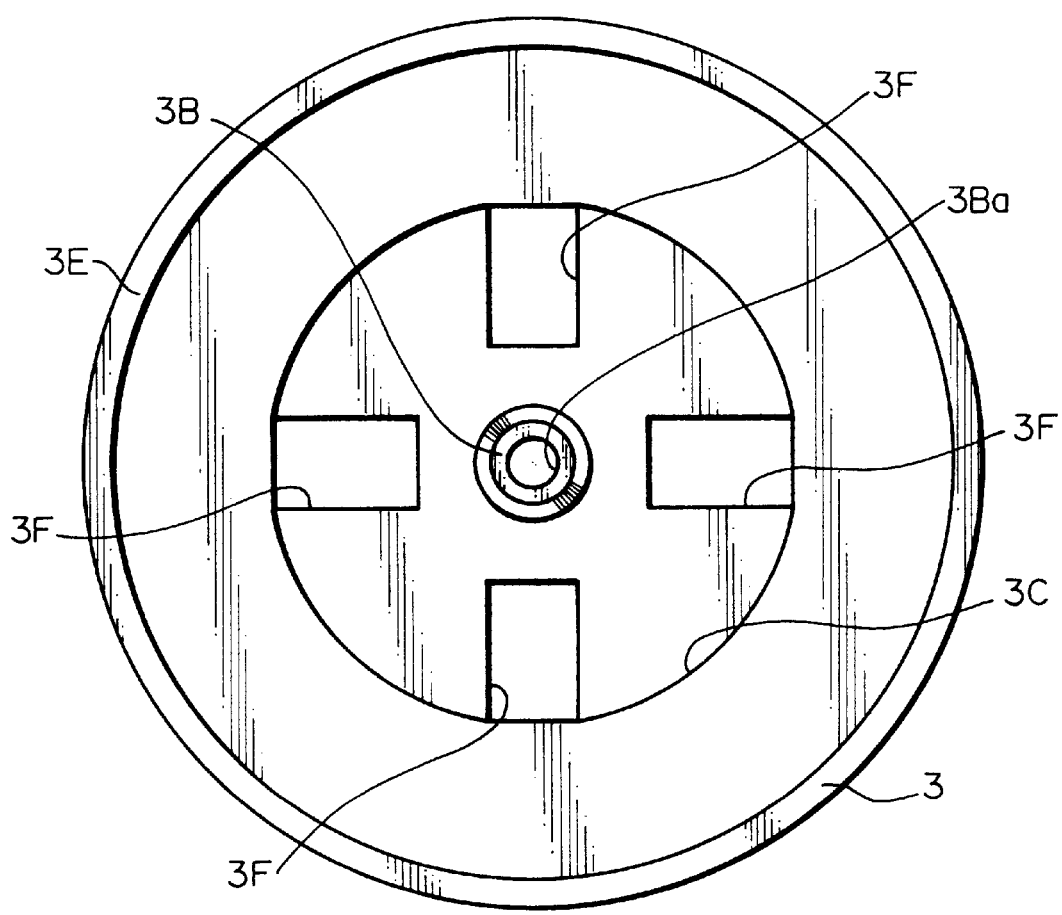
FIG. 7 is a plan view of the lower turntable.

As shown in FIGS. 6 and 7, the lower turntable 3 includes a body 3A to which the upper turntable 2 is affixed with its axis aligning with the axis of the body 3A. A hub or boss 3B is positioned at the center of the body 3A and protrudes upward without having its outer periphery restricted by the projection 2A of the upper turntable 2. A recess 3C surrounds the hub 3B and forms a space for accommodating the movement of the projection 2A.

An annular ridge 3E rises from the outer perimeter of the lower turntable 3 and contacts the outer circumferential surface 2e (see FIG. 4) of the upper turntable 2 at its inner circumferential surface. Specifically, the outer circumferential surface 2e of the turntable 2 is affixed to the inner circumferential surface of the ridge 3E by interference fit. Four holes 3F are formed in the lower turntable 3, and each faces one of the four spring portions 2B of the upper turntable 2. The holes 3B accommodate the spring portions 2B convex toward the turntable 3, as stated earlier. In this condition, the spring portions 2B allow the projection 2A to move up and down while supporting it.

The projection 2A of the upper turntable 2 is suitably sized in matching relation to the hole 100a of the disk 100 such that a part of the outer periphery of the tapered portion 2Aa of the projection 2A contacts the bottom edge or corner of the hole 100a.

As shown in FIG. 8, the spindle motor 103 has an output shaft 103A while the hub 3B of the lower turntable 3 is formed with a through bore 3Ba. The turntable assembly 1 is bodily affixed to the output shaft 103A by interference fit with its bore 3Ba receiving the output shaft 103A. Therefore, the axis of the output shaft 103A and that of the turntable 2 are coincident with each other.

The hub 3B shown in FIGS. 2 and 6 is formed of iron or similar magnetic material or a material containing it. The clamper 101 has a permanent magnet built therein. In this configuration, the disk 100 is sandwiched between the clamper 101 and the hub 3B and fixed in place on the turntable assembly 1 by the attraction of the above magnet.

While the disk 100 is usually centered by a cartridge or the like or by a tray to a certain degree, a clearance exists between the outer contour of the disk 100 and the cartridge or the tray such that the former does not contact the latter during spinning. In light of this, the upper portion of the tapered portion 2Aa has its diameter reduced such that the disk loaded on the projection 2A can be centered even when it is slightly deviated from the center of rotation. On the other hand, the lower portion of the projection 2A is provided with a diameter sufficiently larger than that of the hole 100a of the disk 100. As a result, the disk 100 is fixed in position on the intermediate portion of the tapered portion 2Aa.

In operation, after the disk 100 has been loaded on the turntable assembly 1, it is clamped by the clamper 101. The magnet built in the clamper 101 causes the disk 100 to be held between the clamper 101 and the hub 3B with its attraction. Consequently, the disk 100 is fixed in position on the turntable assembly 1.

The disk 100 positioned at the intermediate portion of the tapered portion 2A is further urged downward until it contacts the entire surface of the upper turntable 2. Subsequently, the spring portions 2B deform downward due to the weight of the disk 100 and the attraction acting between the magnet of the clamper 101 and the hub 3B of the lower turntable 3. At the same time, if the disk 100 is deviated from the output shaft 103A of the spindle motor 103, the spring portions 2B exert a force urging the disk 100 upward until the axis of the disk 100 coincides with the axis of the output shaft 103A.

The spring portions 2B are provided with resiliency sufficient for the above correction beforehand. However, the resiliency is not so great as to cause the magnet of the clamper 101 and the hub 3B of the lower turntable 3 to part from each other, and is so selected as to retain the disk 100 stably even at the time of acceleration and deceleration.

How the spring portions 2B deform due to the loading of the disk 100 is shown in FIGS. 9A and 9B. FIG. 9A shows a condition to occur when the disk 100 is about to be loaded while FIG. 9B shows a condition just after the loading of the disk 100. Each spring portion 2B is convex downward in an arcuate configuration, as stated earlier. This allows the spring portion 2B to easily deform downward while freeing it from rolling deformation.

To prevent stress ascribable to the deformation of the spring portions 2B from deforming the tapered portion 2A*a*, the portion connecting the tapered portion 2A*a* and spring portions 2B may be notched at both sides thereof. In the illustrative embodiment, the projection 2A having the tapered portion 2A*a* is produced by punching; in FIG. 2, the thickness is exaggerated in the axial direction of the output shaft 103A of the spindle motor 103 in order to promote the understanding of the configuration. In practice, the thickness is selected such that the outside diameter and the accuracy of the tapered portion 2A*a* are sufficiently implemented by punching.

By punching and pressing, the projection 2A and the outer perimeter 2*e* of the upper turntable 2 are made coaxial with each other. Also, the through bore 3B*b* of the hub 3B of the lower turntable 3 and the inside diameter of the space or recess 3C are made coaxial with each other. As a result, the output shaft 103*a* of the spindle motor 103 and the axis of the tapered portion 2A are brought into coincidence.

As stated above, because the spring portions 2B allow the projection 2A to move up and down, the turntable assembly 1 is far thinner than the conventional turntables. In addition, the the projection 2A movable up and down obviates the indefinite eccentricity ascribable to the clearance between the conventional projection and the guide shaft. The disk 100 is therefore free from eccentricity which would otherwise occur during spinning due to the loading and unloading of the disk 100. It follows that the illustrative embodiment implements a highly reliable optical disk drive.

In summary, it will be seen that the present invention provides a turntable device for an optical disk and having a highly portable miniature, particularly thin, configuration. This advantage is derived from a unique turntable assembly made up of an upper turntable and a lower turntable. The upper turntable includes a projection having a tapered portion, and spring portions. The tapered portion and spring portions cooperate to surely obviate the eccentricity of an optical disk.

Various modifications will become possible for those skilled in the art after receiving the teachings of the present disclosure without departing from the scope thereof.

What is claimed is:

1. A turntable device for an optical disk, comprising:

a turntable assembly comprising an upper turntable having a disk loading surface at an outer perimeter thereof for supporting a hubless optical disk, and a lower turntable sustaining said upper turntable in a laminate configuration;

a clamper for clamping the optical disk loaded on said turntable assembly at an axis of said turntable assembly; and a spindle motor for driving said turntable assembly;

said upper turntable comprising:

a projection positioned at a center of said upper turntable, having a flaring outer periphery, having a central portion whose end protrudes above said disk loading surface of said upper turntable, and having a circumferential tapered portion; and an annular member supporting said projection via a plurality of spring portions radially extending out from said projection at equally spaced positions, said disk loading surface being implemented by an upper surface of said annular member;

said lower turntable comprising:

a body fixed in place coaxially with said upper turntable;

a boss located at a center of said body and protruding upward without an outer periphery thereof being restricted by said tapered portion; and a recess surrounding said boss for forming a space which allows said tapered portion to move;

said tapered portion being suitably sized in matching relation to a hole formed in a center of the optical disk such that a part of the outer periphery of said tapered portion contacts an edge of the hole of the optical disk.

2. A turntable device as claimed in claim 1, wherein said lower turntable further comprises an annular ridge at an outer perimeter thereof, said annular ridge abutting against an outer circumferential surface of said upper turntable at an inner circumferential surface of said annular ridge.

3. A turntable device as claimed in claim 1, wherein said plurality of spring portions each is convex toward said lower turntable in an arcuate configuration, said lower turntable being formed with holes for accommodating said plurality of spring portions.

4. A turntable as claimed in claim 1, wherein said upper turntable comprises a molding of a plastic having an adequate degree of elasticity.

5. A turntable as claimed in claim 1, wherein said plurality of spring portions comprise three spring portions.

6. A turntable as claimed in claim 1, wherein said plurality of spring portions comprise four spring portions.

* * * * *